United States Patent
Hajbi et al.

(10) Patent No.: US 12,372,167 B2
(45) Date of Patent: Jul. 29, 2025

(54) ANTI-CAVITATION VALVE ASSEMBLY

(71) Applicant: Aquestia Ltd., Kfar Charuv (IL)

(72) Inventors: Yehezkel Hajbi, Nir Israel (IL); Eitan Kalinhoff, Kfar Vradim (IL)

(73) Assignee: Aquestia Ltd., Kfar Charuv (IL)

( * ) Notice: Subject to any disclaimer, the term of this patent is extended or adjusted under 35 U.S.C. 154(b) by 136 days.

(21) Appl. No.: 18/453,484

(22) Filed: Aug. 22, 2023

(65) Prior Publication Data

US 2025/0067365 A1    Feb. 27, 2025

(51) Int. Cl.
*F16K 1/54* (2006.01)
*F16K 1/52* (2006.01)
*F16K 47/08* (2006.01)

(52) U.S. Cl.
CPC ........... *F16K 47/08* (2013.01); *F16K 1/52* (2013.01); *F16K 1/54* (2013.01)

(58) Field of Classification Search
CPC ... F16K 47/08; F16K 1/52; F16K 1/54; F16K 47/04; F16K 47/00; F16K 47/045; F16K 47/06; F16K 47/10; F16K 47/12; F16K 47/14; F16K 47/16; Y10T 137/86734; Y10T 137/86759; Y10T 137/86791–86807
USPC ............ 251/127, 205; 137/625.3, 625.33, 137/625.37–625.39; 138/40, 42, 43
See application file for complete search history.

(56) References Cited

U.S. PATENT DOCUMENTS

| | | | | |
|---|---|---|---|---|
| 3,514,074 A * | 5/1970 | Self | ............... | F16L 55/02781 138/42 |
| 6,701,957 B2 * | 3/2004 | McCarty | ............ | F16K 47/04 137/625.3 |
| 6,935,371 B2 * | 8/2005 | Stares | ............ | F16K 3/24 137/625.37 |
| 7,152,628 B2 * | 12/2006 | Folk | ............ | F16K 47/08 137/625.33 |
| 7,789,066 B2 * | 9/2010 | Torii | ............ | F02M 35/10255 123/336 |
| 9,115,824 B2 * | 8/2015 | Cazcarra Pallaruelo | | F16K 47/08 |
| 9,222,624 B2 * | 12/2015 | McCarty | ............ | F17D 3/18 |
| 9,625,055 B2 * | 4/2017 | Ter Haar | ............ | F16K 47/08 |
| 10,450,831 B2 * | 10/2019 | Hopper | ............ | F16K 47/08 |
| 10,539,252 B2 * | 1/2020 | Adams | ............ | F16K 47/08 |

(Continued)

FOREIGN PATENT DOCUMENTS

DE    202022102340    5/2022
EP    2452110    9/2017

OTHER PUBLICATIONS

Extended European Search Report 24195402.3, Jan. 22, 2025.

*Primary Examiner* — Craig J Price
(74) *Attorney, Agent, or Firm* — Dekel Patent Ltd.; David Klein

(57) ABSTRACT

A valve assembly includes a housing which has a liquid inlet and a liquid outlet, a cover affixed to the housing, a flow regulating assembly located in the housing, and an anti-cavitation flow diverter mounted in the housing. The anti-cavitation flow diverter includes an outer wall that surrounds an inner hollow portion. Sets of flow apertures are formed through the wall thickness of the outer wall. Each flow aperture is open to the inner hollow portion and extends at an angle along a non-radial path through the outer wall. Flows of liquid flowing through each set of the flow apertures impinge upon each other at meeting points which are spaced from inner surfaces of the housing.

10 Claims, 3 Drawing Sheets

(56) References Cited

U.S. PATENT DOCUMENTS

| | | |
|---|---|---|
| 11,359,728 B2 * | 6/2022 | Wolfe ................. F16K 3/34 |
| 2008/0173363 A1 | 7/2008 | Betting |
| 2013/0126770 A1 * | 5/2013 | O'Brien ................. F16K 5/04 251/318 |
| 2014/0264107 A1 | 9/2014 | McCarty |
| 2016/0186891 A1 | 6/2016 | Hopper |
| 2016/0341335 A1 | 11/2016 | Adams |

* cited by examiner

ANTI-CAVITATION VALVE ASSEMBLY

FIELD OF THE INVENTION

The present invention relates generally to valves through which liquid can flow at high pressure and/or high flow rates, and particularly to a valve assembly with anti-cavitation capability.

BACKGROUND OF THE INVENTION

When subjected to high-pressure differentials or high flow rates, valves can exhibit excessive noise and vibration. This is usually due to cavitation, which can range from relatively harmless levels called incipient cavitation to significantly more acute levels that actually damage valves and related piping. This can be loud enough to cause hearing loss in plant personnel if subjected to it for extended periods of time.

Cavitation occurs if the velocity of the fluid in the valve seating area becomes excessive, creating a sudden severe reduction in pressure that transforms the liquid into a vapor state, resulting in the formation of literally thousands of minute bubbles. The subsequent decrease of velocity and pressure rise that occurs after the valve seating area, when the pressure rise condition resumes, causes these vapor bubbles to collapse at the rate of many times per second. Should this occur in close proximity to any metal surface, damage can take place. Over time, this can lead to valve failure due to the vibration and/or erosion. Minimizing or eliminating these conditions that adversely affect operation and service life of the valve continues to be one of the most serious challenges encountered in the daily operation of a water distribution system, such as municipal water systems and the like.

SUMMARY

The present invention seeks to provide a valve assembly with anti-cavitation capability, as described in detail below. The valve assembly may be used in high-pressure environments, such as municipal water supply lines and the like, with no cavitation or noise problems.

There is provided in accordance with a non-limiting embodiment of the invention a valve assembly including a housing which has a liquid inlet and a liquid outlet, a cover affixed to the housing, a flow regulating assembly located in the housing, and an anti-cavitation flow diverter mounted in the housing, the anti-cavitation flow diverter including an outer wall that surrounds an inner hollow portion, the outer wall having a wall thickness and a wall height that extends between first and second faces, wherein sets of flow apertures are formed through the wall thickness, each of the flow apertures being open to the inner hollow portion and extending at an angle along a non-radial path through the outer wall, and wherein flows of liquid flowing through each set of the flow apertures impinge upon each other at meeting points which are spaced from inner surfaces of the housing.

BRIEF DESCRIPTION OF DRAWINGS

The present invention will be understood and appreciated more fully from the following detailed description, taken in conjunction with the drawings in which.

DETAILED DESCRIPTION

Figure 1:
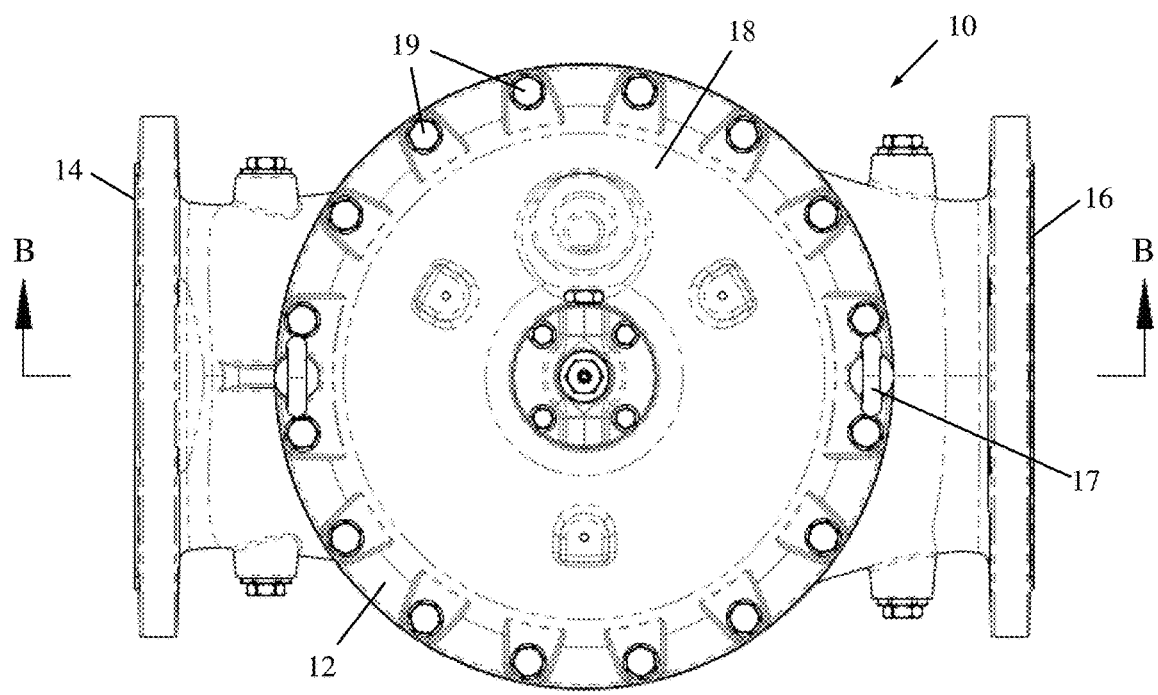
FIG. 1 is a simplified top-view illustration of a valve assembly, in accordance with a non-limiting embodiment of the invention.
Figure 2:
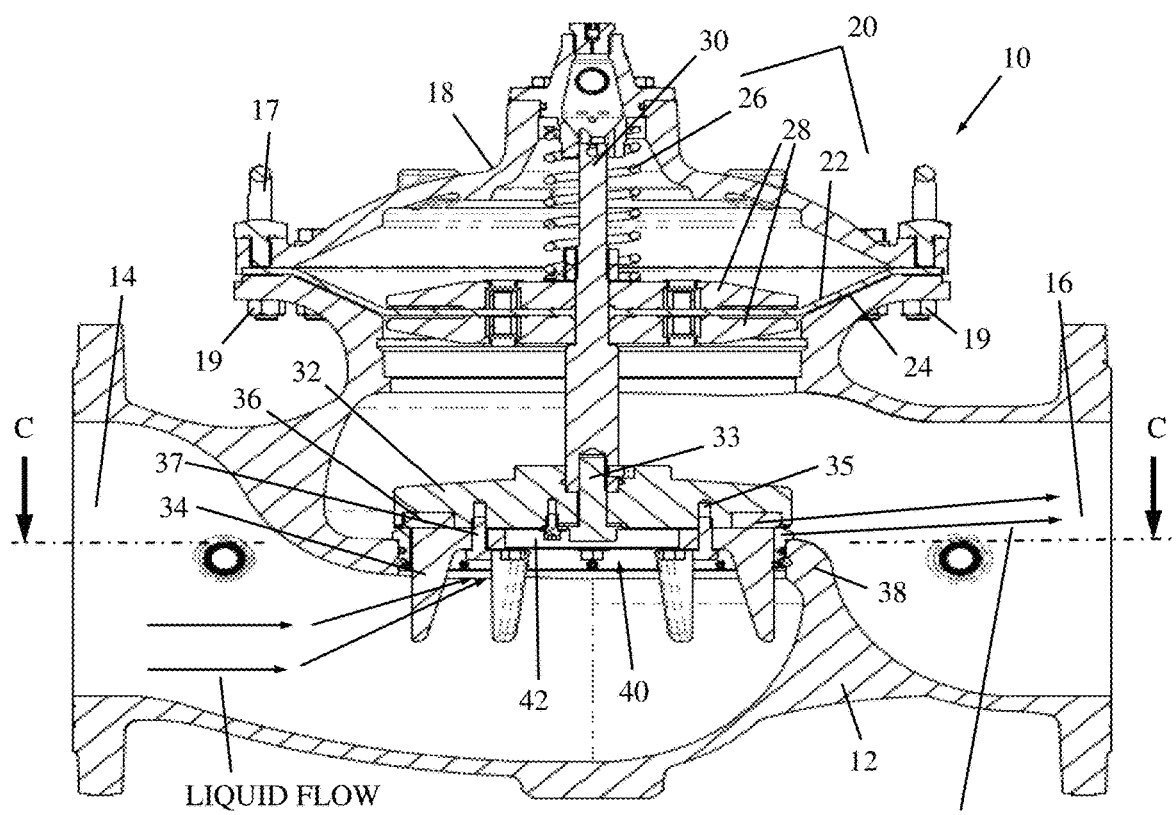
FIG. 2 is a simplified sectional, planar view illustration of the valve assembly, taken along lines B-B in FIG. 1.

Reference is now made to FIGS. 1 and 2, which illustrate a valve assembly 10, in accordance with a non-limiting embodiment of the invention.

Valve assembly 10 may include a housing 12 which has a liquid inlet 14 and a liquid outlet 16. The inlet 14 and outlet 16 may be located at generally opposite sides of housing 12. A cover 18 may be affixed to housing 12 with one or more fasteners 19, such as bolts and nuts, and the like. Housing 12 and cover 18 are typically made of strong, corrosion-resistant materials, such as cast metal and the like. Valve assembly 10 may include one or more lifting lugs 17.

Reference is made particularly to FIG. 2. Valve assembly 10 may include a flow regulating assembly 20, which may include a diaphragm 22 which is urged against a valve seat 24 (formed in housing 12) by a biasing device 26, such as a coil spring. A disc 28 may be mounted on diaphragm 22. The diaphragm 22, disc 28, and biasing device 26 may be mounted on a shaft 30. The upper end (in the sense of FIG. 2) of shaft 30 may be coupled to inner structure of cover 18.

The lower end of shaft 30 may be coupled to a disc plate 32, such as by means of a fastener 33. The disc plate 32 sealingly seats against a hollow base member 34 by means of a seal 36, such as an O-ring. The hollow base member 34 may be sealingly secured to an inner annulus 38 of housing 12 formed at the flow-through area between the inlet and outlet.

In accordance with a non-limiting embodiment of the invention, an anti-cavitation flow diverter 40 may be mounted in the central hollow of hollow base member 34. Liquid can flow into anti-cavitation flow diverter 40 at a diverter inlet 42, which is an opening at the bottom of diverter 40 (bottom in the sense of the drawings). The structure and operation of anti-cavitation flow diverter 40 is described below with reference to FIGS. 3 and 4A-4B. As will be described below, liquid that has entered inlet 14 can flow through anti-cavitation flow diverter 40 towards outlet 16 in such a way that no cavitation occurs.

It is noted that the disc plate 32 and the flow regulating assembly 20 can each be used to regulate liquid flow through valve assembly 10. Initially, biasing device 26 urges diaphragm 22 against valve seat 24 and also urges disc plate 32 against hollow base member 34. When a sufficient amount of liquid flows into the housing 12, the liquid force can overcome the spring force exerted by biasing device 26 so that disc plate 32 is lifted off hollow base member 34. The movement of disc plate 32 may be guided by guide members 37 (such as guide pins) mounted in hollow base member 34 that are received in grooves or holes 35 formed in disc plate 32. Likewise, a sufficient liquid can overcome the spring force exerted by biasing device 26 so that diaphragm 22 flexes away from valve seat 24. Control valves (not shown) can be added to the valve assembly 10 to divert liquid to the volume above diaphragm 22 to counteract liquid forces and maintain diaphragm 22 against valve seat 24. Thus, the control valves can purposely control the amount disc plate 32 moves away from hollow base member 34, and purposely control the amount diaphragm 22 flexes away from valve seat 24. These two actions can regulate how much liquid flows through anti-cavitation flow diverter 40.

Figure 3:
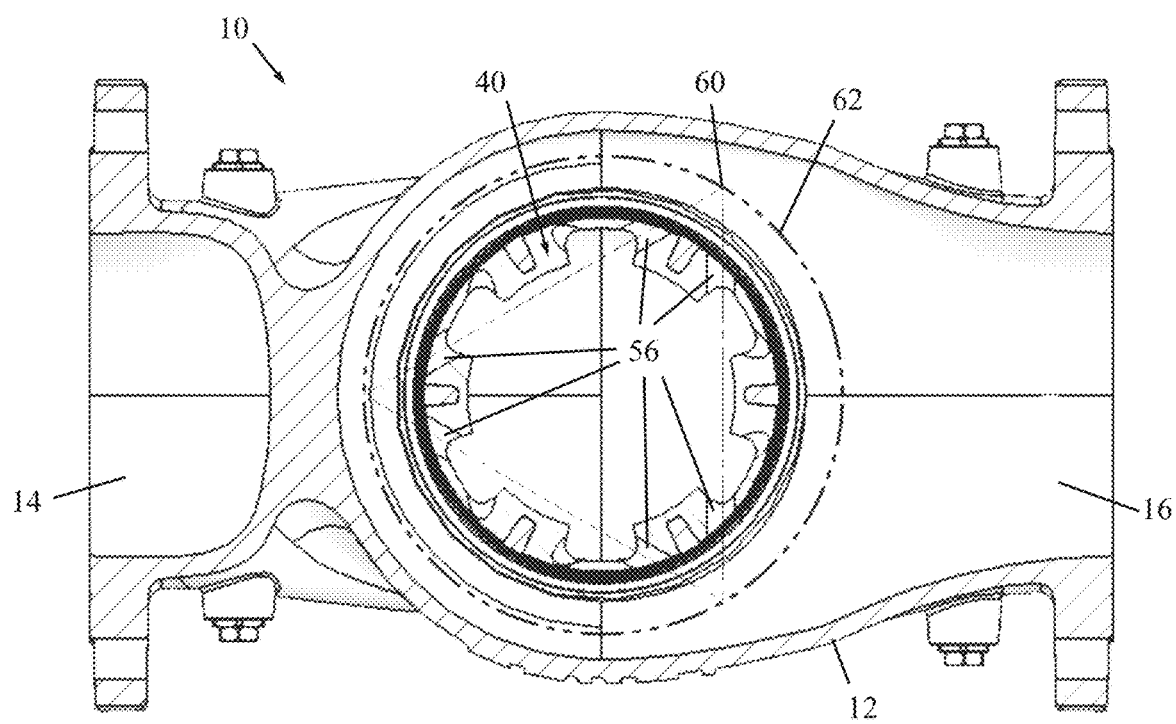
FIG. 3 is a simplified sectional illustration of the valve assembly, showing an anti-cavitation flow diverter, in accordance with a non-limiting embodiment of the invention, taken along lines C-C in FIG. 2.
Figure 4A:
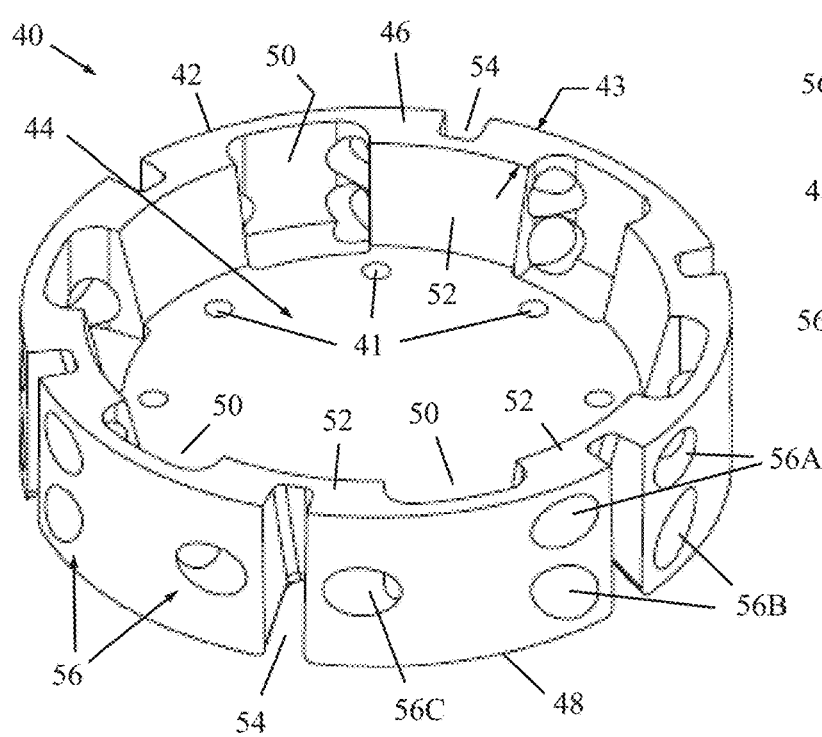
FIGS. 4A-4B are simplified perspective and side-view illustrations, respectively, of the anti-cavitation flow diverter.
Figure 4B:
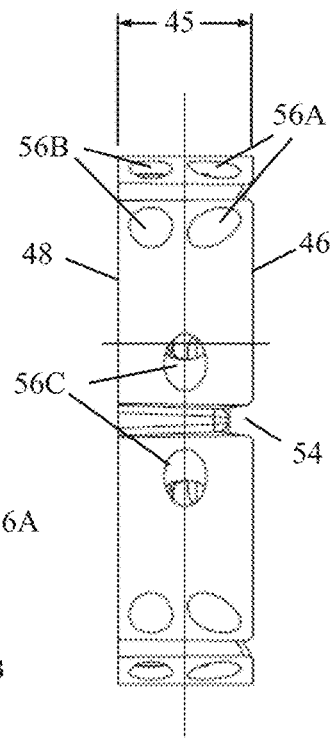

Reference is now made to FIGS. 4A-4B. The anti-cavitation flow diverter 40 may, without limitation, have a ring shape (other shapes, round or not round, are also within the scope of the invention). The anti-cavitation flow diverter 40 has an outer wall 42 that surrounds an inner hollow portion 44. Outer wall 42 may be straight (as seen in FIG. 4A) or optionally slanted (such as being slanted inwards, as seen in FIG. 3). Outer wall 42 has a wall thickness 43 and a wall height 45 (FIG. 4B). The wall height 45 extends between first (upper in the sense of FIG. 4A, right in the sense of FIG. 4B) and second (lower) faces 46 and 48, respectively, of anti-cavitation flow diverter 40. Anti-cavitation flow diverter 40 may have mounting holes 41 (FIG. 4A) for mounting in the hollow base member.

Outer wall 42 may be formed with a plurality of inner wall grooves 50 that are radially open to inner hollow portion 44. The inner wall grooves 50 are spaced symmetrically about the center point of the faces 46 and 48. Each inner wall groove 50 is adjacent a web portion 52 which has the full thickness of the wall thickness 43. Each web portion 52 may have an outer wall groove 54 open to the outer wall 42 but does not extend through the entire wall thickness 43. The outer wall grooves 54 are optional and may be used to save on weight and material.

A plurality of flow apertures 56 are formed through the entire wall thickness 43. Each flow aperture 56 is open to inner hollow portion 44 and extends at an angle along a non-radial path through the outer wall 42 (non-radial path means the path is not a long a radius of anti-cavitation flow diverter 40). For example, in the illustrated embodiment, each flow aperture 56 extends from a starting point on a corner of inner wall groove 50 through web portion 52 and is open through the outer wall 42. The inner wall groove 50 may serve as a funnel to channel the flow into the flow aperture 56.

In the illustrated embodiment, as seen in FIG. 3, FIGS. 4A-4B and FIGS. 5A-5D, there are six inner wall grooves 50 symmetrically spaced about the center of anti-cavitation flow diverter 40 and there are three sets of flow apertures 56, and in each set there are three flow apertures symmetrically spaced about the center of anti-cavitation flow diverter 40 at angles of 60° thereby forming an equilateral triangle for jet flow through the flow apertures 56. The three sets of flow apertures 56 are designated 56A, 56B and 56C in FIGS. 4A-4B and FIGS. 5A-5D. It is noted that flow apertures 56A and 56B are at equal circumferential stations on the perimeter of anti-cavitation flow diverter 40, one closer to the first face 46 and the other closer to the second face 48. The flow apertures 56C are spaced circumferentially from flow apertures 56A and 56B and may be equidistant between first face 46 and second face 48. These arrangements are non-limiting, and the invention can be carried out with other numbers of flow apertures 56 and at other angles.

Figure 5A:
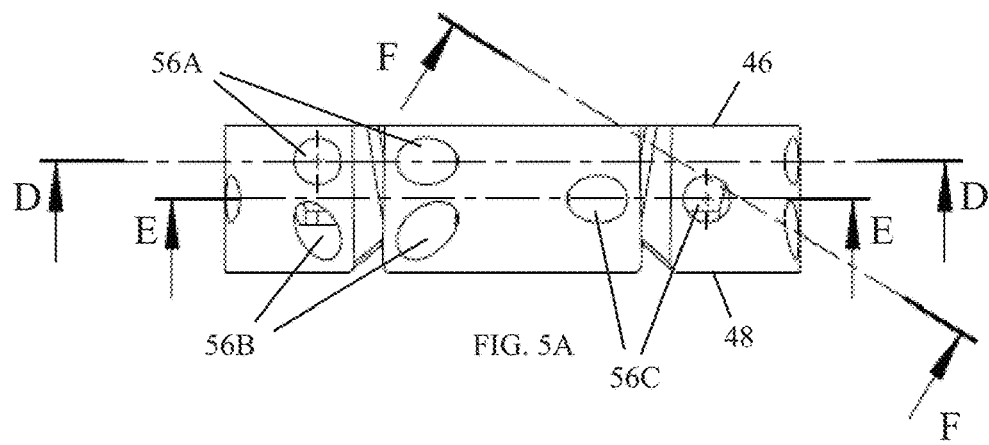
FIG. 5A is another side view of the anti-cavitation flow diverter.
Figure 5B:
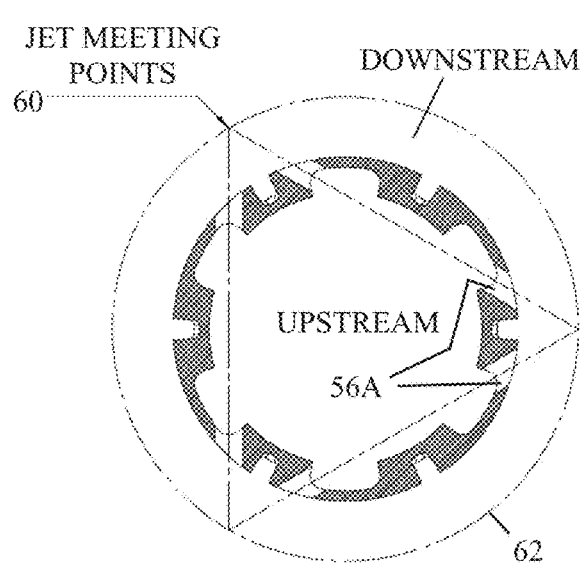
FIGS. 5B, 5C and 5D are sectional views showing the meeting points of the jet flow through the anti-cavitation flow diverter, respectively taken along lines D-D, E-E and F-F in FIG. 5A.
Figure 5C:
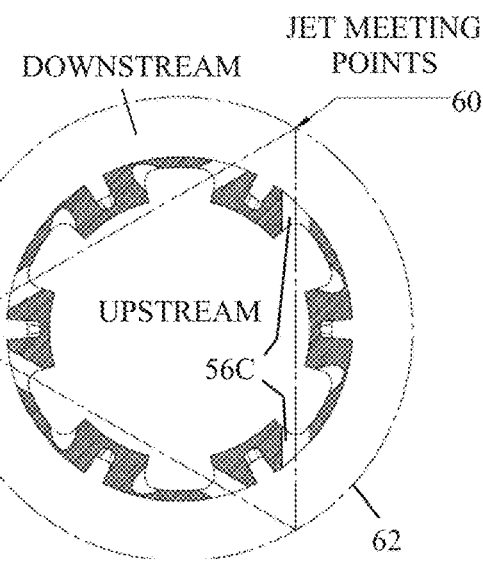
Figure 5D:
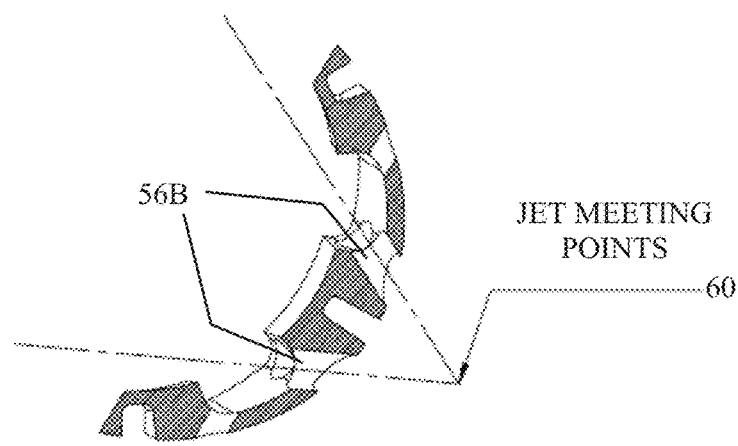

As seen in FIGS. 5B-5D, the jet flows through each set of flow apertures 56 (56A, 56B and 56C) and meet at meeting points 60 along an imaginary circle 62 (also shown in FIG. 3). The flows impinge upon each other at meeting points 60 which is spaced from the inner surfaces of the housing 12 of valve assembly 10. This prevents cavitation, noise and damage to the housing 12 of valve assembly 10.

What is claimed is:

1. A valve assembly comprising:
   a housing which has a liquid inlet and a liquid outlet;
   a cover affixed to said housing;
   a flow regulating assembly located in said housing; and
   an anti-cavitation flow diverter mounted in said housing, said anti-cavitation flow diverter comprising an outer wall that surrounds an inner hollow portion, said outer wall having a wall thickness and a wall height that extends between first and second faces, wherein sets of flow apertures are formed through said wall thickness, each of said flow apertures being open to said inner hollow portion and extending at an angle along a non-radial path through said outer wall, and wherein flows of liquid flowing through each set of said flow apertures impinge upon each other at meeting points which are spaced from inner surfaces of said housing.

2. The valve assembly according to claim 1, wherein said meeting points are along an imaginary circle spaced from the inner surfaces of said housing, and impinge upon each other between the outer wall of said anti-cavitation flow diverter and said inner faces of said housing.

3. The valve assembly according to claim 1, wherein said sets of flow apertures comprise three sets symmetrically spaced about a center of said anti-cavitation flow diverter at angles of 60° thereby forming an equilateral triangle for flow through said flow apertures.

4. The valve assembly according to claim 1, wherein said outer wall is formed with inner wall grooves that are radially open to said inner hollow portion.

5. The valve assembly according to claim 4, wherein said inner wall grooves are spaced symmetrically about a center point of said first and second faces.

6. The valve assembly according to claim 4, wherein each of said inner wall grooves is adjacent a web portion which has a full thickness of said wall thickness.

7. The valve assembly according to claim 6, wherein each of said flow apertures extends from a starting point on a corner of a corresponding one of said inner wall grooves through said web portion and is open through said outer wall.

8. The valve assembly according to claim 1, wherein some of said flow apertures are at equal circumferential stations on a perimeter of said anti-cavitation flow diverter, one closer to said first face and the other closer to said second face.

9. The valve assembly according to claim 1, wherein some of said flow apertures are equidistant between said first face and said second face.

10. The valve assembly according to claim 1, wherein said anti-cavitation flow diverter is mounted in a hollow base member of said flow regulating assembly.

* * * * *